(12) United States Patent
Salem

(10) Patent No.: US 10,979,898 B1
(45) Date of Patent: *Apr. 13, 2021

(54) DEVICES AND METHODS FOR PREVENTING TRACKING OF MOBILE DEVICES

(71) Applicant: Facebook Technologies, LLC, Menlo Park, CA (US)

(72) Inventor: Marc Ihaab Salem, Sunnyvale, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/743,954

(22) Filed: Jan. 15, 2020

Related U.S. Application Data

(63) Continuation of application No. 16/540,503, filed on Aug. 14, 2019, now Pat. No. 10,616,760.

(51) Int. Cl.
| | |
|---|---|
| *H04W 12/02* | (2009.01) |
| *H04L 29/12* | (2006.01) |
| *H04W 12/00* | (2021.01) |
| *H04W 76/14* | (2018.01) |
| *H04W 76/12* | (2018.01) |

(52) U.S. Cl.
CPC ......... *H04W 12/02* (2013.01); *H04L 61/2092* (2013.01); *H04L 61/6022* (2013.01); *H04W 12/003* (2019.01); *H04W 12/0017* (2019.01); *H04W 76/12* (2018.02); *H04W 76/14* (2018.02)

(58) Field of Classification Search
CPC ............. H04W 12/001; H04W 12/002; H04W 12/0023; H04W 12/003; H04W 12/004; H04W 12/0051; H04W 76/10; H04W 76/12; H04W 76/14; H04W 12/02; H04L 9/00

See application file for complete search history.

(56) References Cited

U.S. PATENT DOCUMENTS

| | | | | |
|---|---|---|---|---|
| 9,042,549 | B2 * | 5/2015 | Xiao | H04W 12/003 |
| | | | | 380/262 |
| 10,616,760 | B1 * | 4/2020 | Salem | H04W 12/003 |
| 2011/0066850 | A1 * | 3/2011 | Ekberg | H04W 12/02 |
| | | | | 713/162 |
| 2014/0133656 | A1 * | 5/2014 | Wurster | H04W 12/08 |
| | | | | 380/270 |
| 2017/0013450 | A1 * | 1/2017 | Ziv | H04W 12/001 |
| 2017/0339100 | A1 * | 11/2017 | Lee | H04W 4/80 |
| 2018/0172664 | A1 * | 6/2018 | Love | H04W 12/02 |

(Continued)

*Primary Examiner* — Blane J Jackson
(74) *Attorney, Agent, or Firm* — Baker Botts L.L.P.

(57) ABSTRACT

In one embodiment, a method by a stage device includes receiving from a client device a first randomized client address to be used during a pairing session; sending to the client device a first randomized stage address to be used during the pairing session; communicating with the client device using the first randomized client address and the first randomized stage address to establish at least one common randomization parameter; periodically generating, based on the at least one common randomization parameter, a second randomized client address and a second randomized stage address; and communicating with the client device in a paired communication session using the second randomized client address and the second randomized stage address.

20 Claims, 6 Drawing Sheets

(56) References Cited

U.S. PATENT DOCUMENTS

2019/0081937 A1\* 3/2019 Lu ..................... H04L 63/0492
2019/0281547 A1\* 9/2019 Yoon ................ H04N 21/43615
2019/0357040 A1\* 11/2019 Benoliel ......... H04W 12/04033

\* cited by examiner

DEVICES AND METHODS FOR PREVENTING TRACKING OF MOBILE DEVICES

PRIORITY

This application is a continuation under 35 U.S.C. § 120 of U.S. patent application Ser. No. 16/540,503, filed 14 Aug. 2019, which is incorporated herein by reference.

TECHNICAL FIELD

This disclosure generally relates to securely pairing wireless devices.

BACKGROUND

Artificial reality solutions may comprise an artificial reality client device paired to a computing system (a "stage"). The client device may include without limitation a headset or glasses. The stage may be a computer system or any suitable computing device. The stage may comprise sensors for detecting a user location, direction, and/or orientation, elements for data input and output including without limitation microphones, speakers, and screens. The stage may be capable of executing software applications. This pairing process between the stage and client devices may occur over a wired connection, but many artificial reality implementations include devices paired wirelessly. To ensure secure communications between the stage and client when communicating wirelessly, the stage and client may use unique identifiers to help identify trusted devices.

In existing solutions, these unique identifiers may be passed between the stage and client in plain-text using wireless communication standards, including without limitation WiFi and Bluetooth communications, which may permit an adversary-someone "listening" to the wireless communications—to view the unique identifiers. A device-including, for example, a stage or client—is mobile and may periodically broadcast the plain-text identifier and an adversary can use this identifier to track the user based on the mobile device's broadcasts. Existing solutions for preventing a device from being unknowingly tracked by an adversary focus on randomizing a unique identifier, such as a MAC address. In existing solutions, the MAC address may be randomized each time the device attempts to connect to the stage. For example, if the client uses a first MAC address in a first location and randomizes the MAC address before broadcasting at a second location, an adversary may have difficulty spatially tracking the client.

Randomizing the MAC address and other efforts attempt to anonymize the wireless communications between the client and stage. However, when the client and stage are both mobile such that the client may travel with the stage—for example, when the client is a pair of artificial reality glasses and the stage is a mobile phone—a third-party could eavesdrop on the wireless communication between the client and stage to track both devices, even when a randomized MAC addresses are used. Additionally, randomization of MAC addresses occurs only during the initial pairing process and will then use a particular MAC address once a connection is established between the client and stage, where the particular MAC address can then be used for tracking.

SUMMARY OF PARTICULAR EMBODIMENTS

Described herein is a method comprising, by a client device, receiving, from a stage device, a first randomized stage address to be used during a pairing session; sending, to the stage device, a first randomized client address to be used during the pairing session; communicating with the stage device using the first randomized stage address and the first randomized client address to verify that the stage device is in possession of a shared secret data possessed by the client device; and establish at least one common randomization parameter with the stage device; periodically generating, based on the at least one common randomization parameter, a second randomized stage address and a second randomized client address; and communicating with the stage device in a paired communication session using the second randomized stage address and the second randomized client address.

Described herein is one or more computer-readable non-transitory storage media embodying software that is operable when executed by a client device to receive, from a stage device, a first randomized stage address to be used during a pairing session; send, to the stage device, a first randomized client address to be used during the pairing session; communicate with the stage device using the first randomized stage address and the first randomized client address to verify that the stage device is in possession of a shared secret data possessed by the client device; and establish at least one common randomization parameter with the stage device; periodically generate, based on the at least one common randomization parameter, a second randomized stage address and a second randomized client address; and communicate with the stage device in a paired communication session using the periodically generated second randomized stage address and the second randomized client address.

Described herein is a client device comprising one or more processors; and one or more computer-readable non-transitory storage media coupled to one or more of the one or more processors and comprising instructions operable when executed by one or more of the one or more processors to cause the client device to receive, from a stage device, a first randomized stage address to be used during a pairing session; send, to the stage device, a first randomized client address to be used during the pairing session; communicate with the stage device using the first randomized stage address and the first randomized client address to verify that the stage device is in possession of a shared secret data possessed by the client device; and establish at least one common randomization parameter with the stage device; periodically generate, based on the at least one common randomization parameter, a second randomized stage address and a second randomized client address; and communicate with the stage device in a paired communication session using the second randomized stage address and the second randomized client address.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
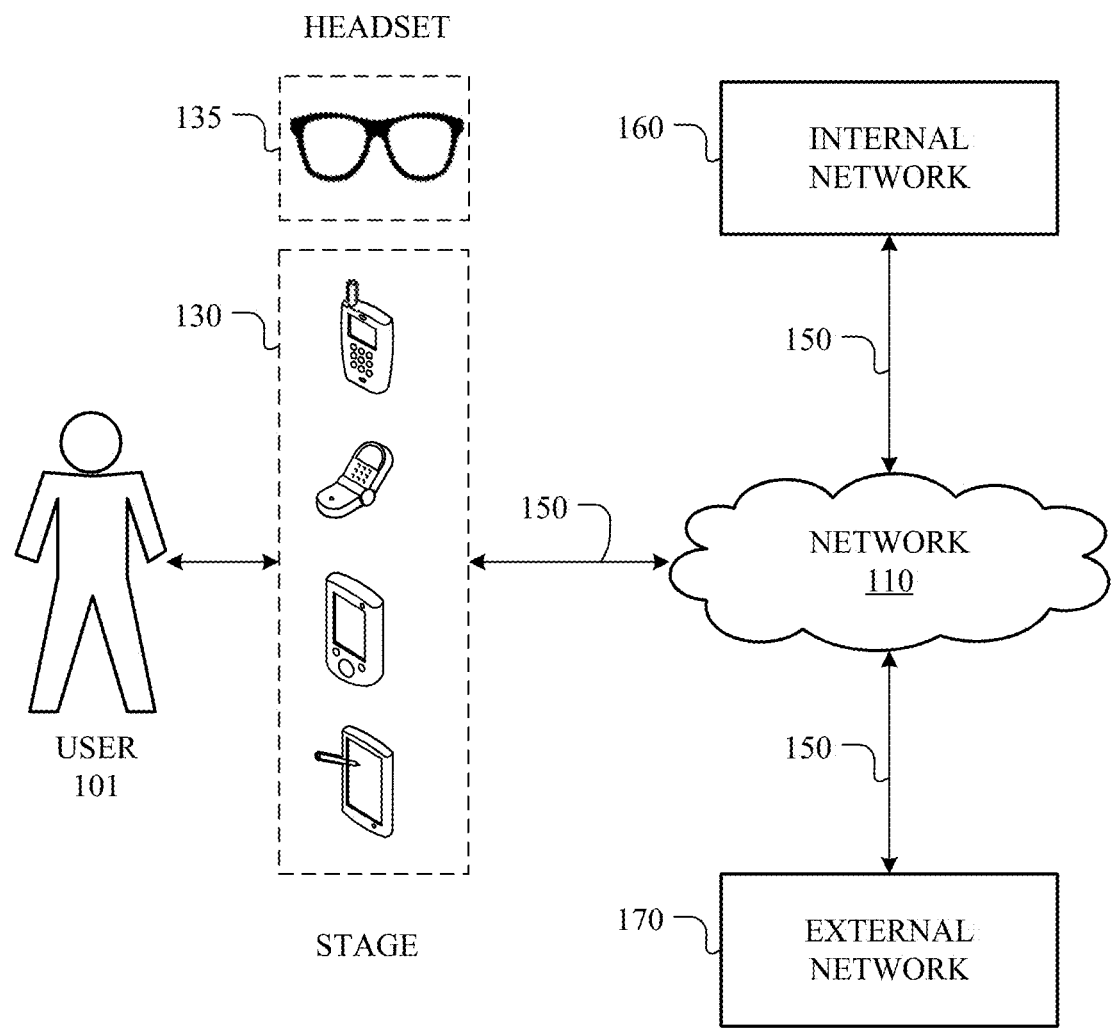
FIG. 1 illustrates an example client-stage system.

FIG. 1 illustrates an example client-stage system. A user may use a paired combination of a stage 130 and a client 135. The stage 130 may comprise one or more computing devices. For example and not by way of limitation, the stage 130 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. In particular embodiments, the stage may be mobile. The stage may further comprise hardware supporting one or more methods for communicating with a network. The stage may also include without limitation one or more cameras, scanners, touchscreens, microphones, or speakers. The stage may also be capable of executing software applications including without limitation games, web browsers, or social-networking applications. This disclosure contemplates any suitable stages 130. A stage 130 may enable a network user using stage 130 to access network 150.

Link 150 may connect stage 130 to network 110. In particular embodiments, stage 130 may be coupled to an internal network 160 via links 150 and network 110. In particular embodiments, stage 130 may be coupled to an external network 170 via links 150 and network 110. This disclosure contemplates any suitable links 150. In particular embodiments, one or more links 150 may include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each may include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link including without limitation links 150, or a combination of two or more such links 150. Links 150 need not necessarily be the same throughout network environment 110. One or more first links 150 may differ in one or more respects from one or more second links 150.

In particular embodiments, each of an internal network 160 and/or external network 170 may include one or more types of servers, one or more data stores, one or more interfaces, including but not limited to APIs, one or more web services, one or more content sources, one or more networks, or any other suitable components, e.g., that servers may communicate with. An internal network 160 and/or external network 170 may be operated by a different entity. In particular embodiments, however, internal network 160 and/or external network 170 may operate in conjunction with each other to provide services to users.

In particular embodiments, the client 135 may comprise an artificial reality device, including without limitation a headset or glasses. In particular embodiments, the client 135 may be mobile. The client 135 may also include without limitation one or more cameras, scanners, touchscreens, microphones, or speakers. The client 135 may also be capable of executing software applications, including without limitation games, web browsers, informational applications, or social-networking applications. The client 135 and stage 130 may comprise hardware and/or software enabling wireless communications between the two devices using, for example and without limitation, Bluetooth communications, near field communications (NFC), infrared communication, or communication via a wireless local area network or cellular-telephone network. The client 135 and stage 130 may each use a unique identifier to identify itself and may rely on unique identifiers provided by other devices to identify trusted devices to protect wireless communications and prevent exposure of private information to untrusted devices, including without limitation devices used by adversaries.

In existing solutions, the stage 130 and client 135 may pass unique identifiers in plain-text using WiFi or Bluetooth communications, which may permit an adversary to view the unique identifiers. Accordingly, an adversary can use these identifiers to track a specific stage or client. For example, retailers may track users using WiFi communications links. In fact, some retailers may combine user behavior in combination with credit card data to attempt to de-anonymize wireless communications and to track users and their purchasing habits to better understand user purchasing behavior and movement to, for example, improve marketing efforts.

In particular embodiments of existing solutions, the wireless communications between the client and stage may be encrypted to attempt to prevent tracking of the client and stage. However, even when anonymized via encryption, an adversary may identify the stage and client by searching for the encrypted unique identifiers to track the movement of the stage and client. Existing solutions for preventing a device from being unknowingly tracked focus on randomizing one or more MAC addresses associated with the devices, where randomization of the MAC address occurs each time the stage and client attempt to pair or re-pair. That is, in existing solutions, a client may connect to a first access point using a first random MAC address but may use a second random MAC address when connecting to a second access point. By randomizing a device's MAC address at each access point connection, the device's wireless communication may be anonymized.

However, these attempts to anonymize communications may be insufficient when both the client and stage are mobile and travel together. In particular, the stage may use a first randomized stage MAC address and the client may use a first randomized client MAC address to attempt to pair and for subsequent communications. However, because the client and stage travel together and assuming there are no connection issues between the client and stage, there would be no reason for the client and stage to attempt to pair or re-pair, resulting in all communications using the first randomized stage MAC address and the first randomized device MAC address. That is, absent a pairing or re-pairing attempt, additional randomized MAC addresses are not generated. Accordingly, communications between the two devices would therefore be trackable using either of the first randomized stage MAC address and the first randomized device MAC address. In contrast, if the client attempted to connect to a different stage, the client would generate a new randomized client MAC address for communication with the different stage and the new randomized MAC address may prevent tracking. However, in certain embodiments, it would be undesirable to require a client to periodically pair with a new device to prevent tracking.

To prevent tracking using the example client-stage system, the client and stage may periodically generate new random identifiers, for example MAC addresses, for communication, even when additional pairing attempts are not required. For example, when traveling together, the client and stage may agree on certain parameters for generating random MAC addresses and may agree on when the new random MAC addresses will be generated. The client and stage may exchange one or more randomization parameters to support generating new random MAC addresses during paired communications and may coordinate the generation of these new random MAC addresses such that only the client and stage know the new random MAC address to expect from the paired device and know when the new random MAC address will be used for subsequent communications.

Figure 2:
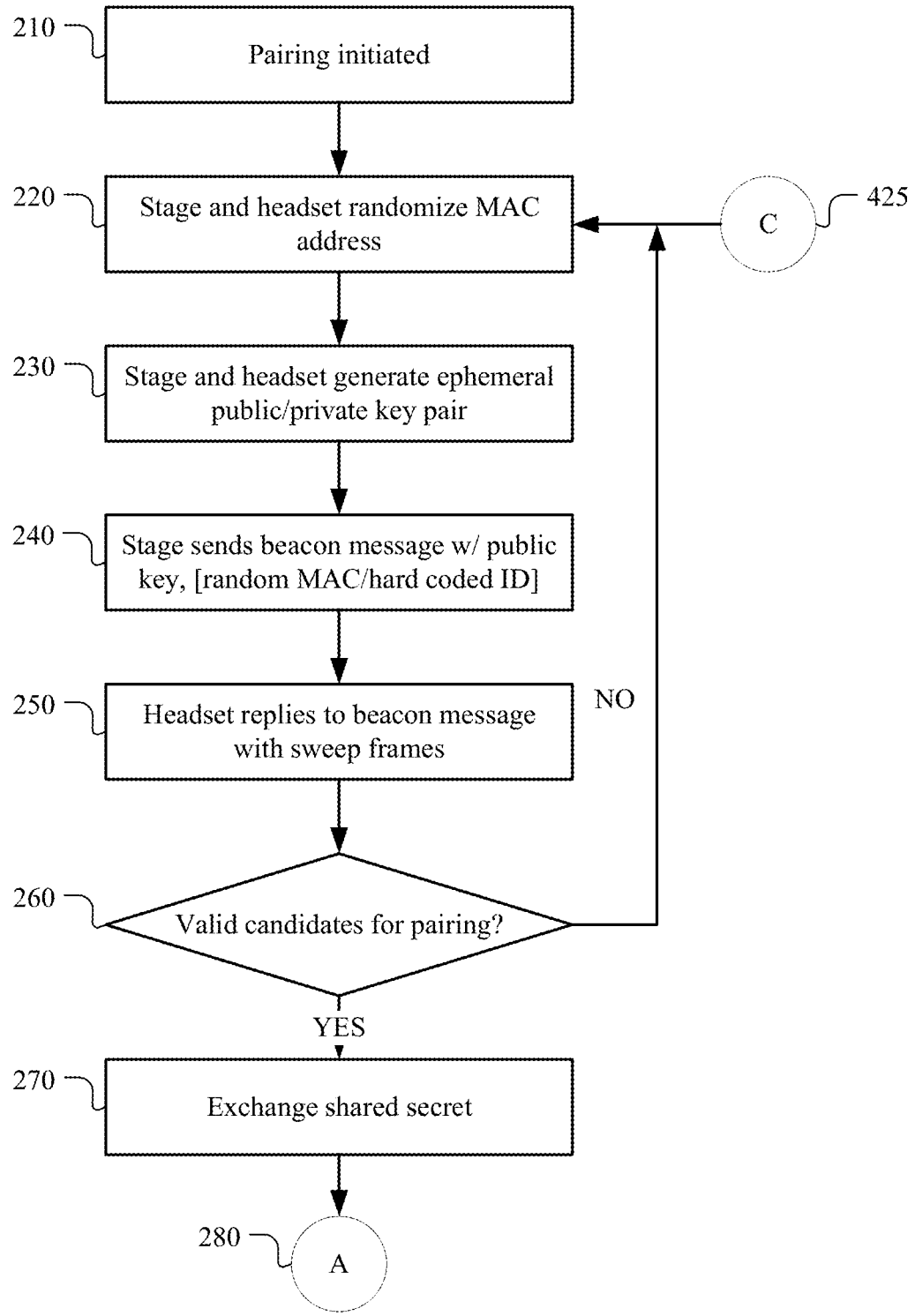
FIGS. 2-4 illustrate an example method of secure pairing and communication between wireless devices.
Figure 3:
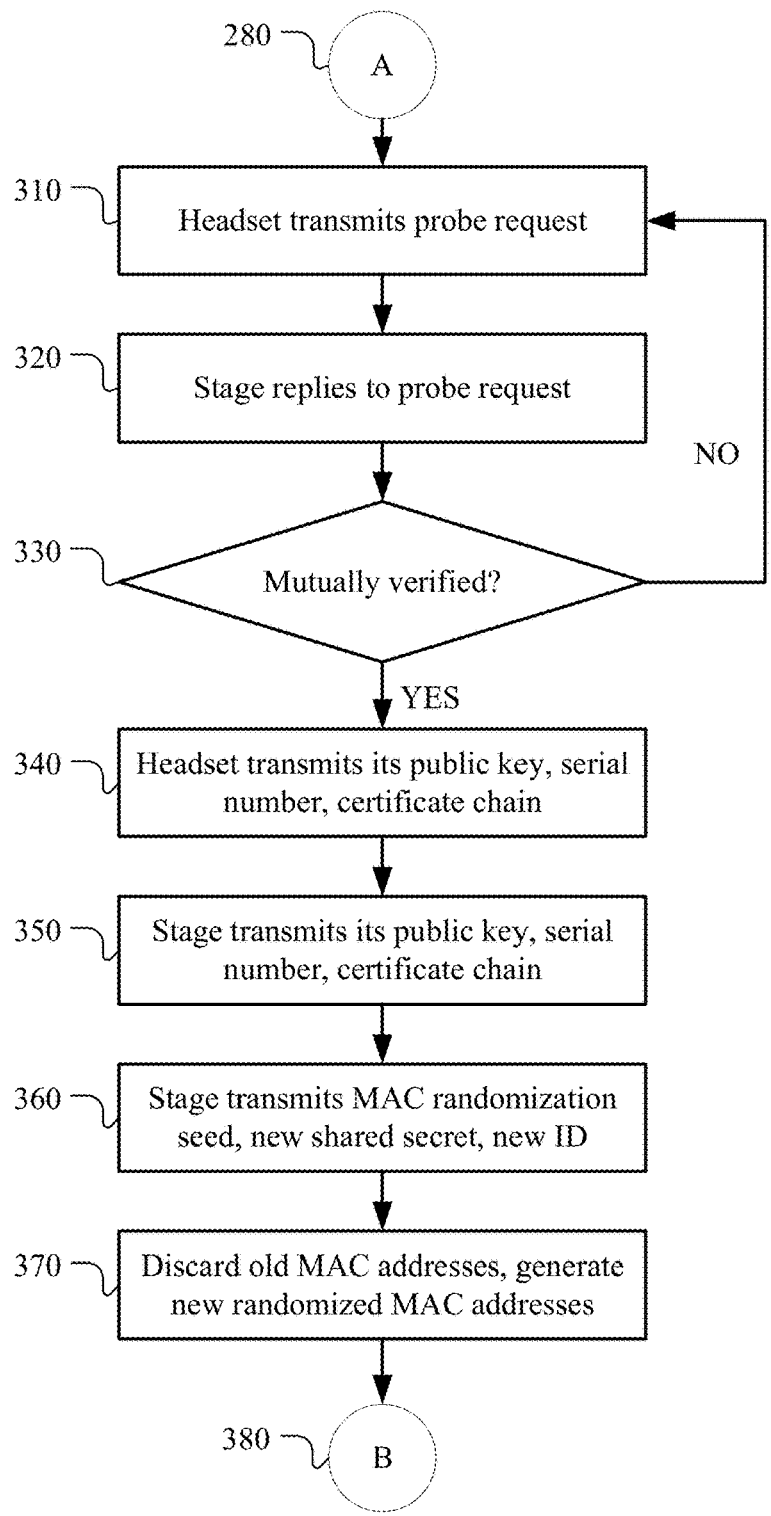
Figure 4:
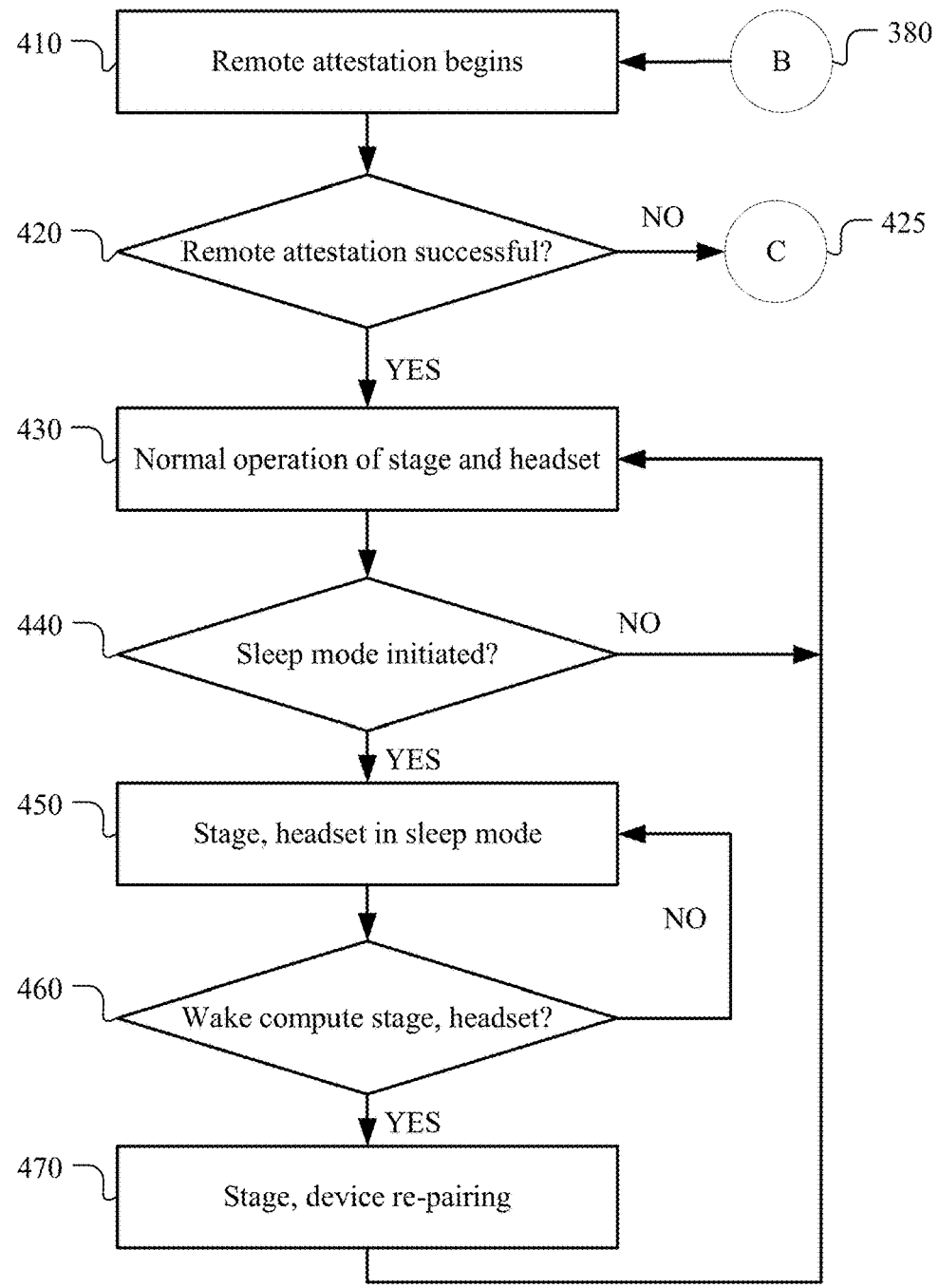

FIGS. 2-4 illustrate an example method of secure pairing and communication between wireless devices, as shown in methods 200, 300, 400. At step 210 of method 200, the stage 130 and client 135 may initiate the pairing process. Specifically, the client 135 and stage 130 may both enter discovery mode to search for potential devices for pairing.

At step 220, the stage 130 may generate a randomized stage address and client 135 may generate a randomized client address. The randomized stage address and randomized client address may each comprise a MAC address and may be generated randomly. These randomized addresses may be used throughout the pairing process until this pairing attempt is complete. If a pairing attempt is unsuccessful, for example and without limitation if pairing fails at step 260, the client 135 may replace the current randomized client address with a newly generated randomized client address and stage 130 may replace the current randomized stage address with a newly generated randomized stage address. The previous randomized client address and previous randomized stage address may be discarded, and the new randomized client address and new randomized stage address may instead be used for subsequent pairing attempts.

At step 230, the stage 130 may generate a stage ephemeral public/private key pair and the client 135 generate a client ephemeral public/private key pair. In particular embodiments, the stage 130 and client 135 may use the stage ephemeral public/private key pair and client ephemeral public/private key pair for pairing until the client 135 and stage 130 successfully pair and exchange a shared secret.

At step 240, the stage 130 may send a beacon message. The beacon message may comprise one or more of the randomized stage address generated at step 220, a discovery mode flag indicating the stage 130 is searching for devices with which it can pair, and a wildcard BSSID. In particular embodiments, the stage 130 may send a beacon message in conformance with the 802.11ay standard and may use any channel of the 60 GHz frequency specified by the 802.11ay standard. Accordingly, the beacon message may further comprise data necessary to fill the fields required by the 802.11ay standard. In particular embodiments, channel 2 of the 60 Ghz frequency of the 802.11ay standard may be preferred as the most commonly available channel. In particular embodiments, the stage's beacon message may further comprise Vendor Specific Information Elements (VS-IE). The VS-IE may comprise the stage device type, the software version running on the stage, and the ephemeral public key generated at step 230. The VS-IE may further indicate the stage's paired state. As an example and not by way of limitation, the stage 130 may specify a paired state value of zero if the stage 130 is attempting to pair for the first time, or a paired state value of one for re-pairing attempts.

Figure 5:
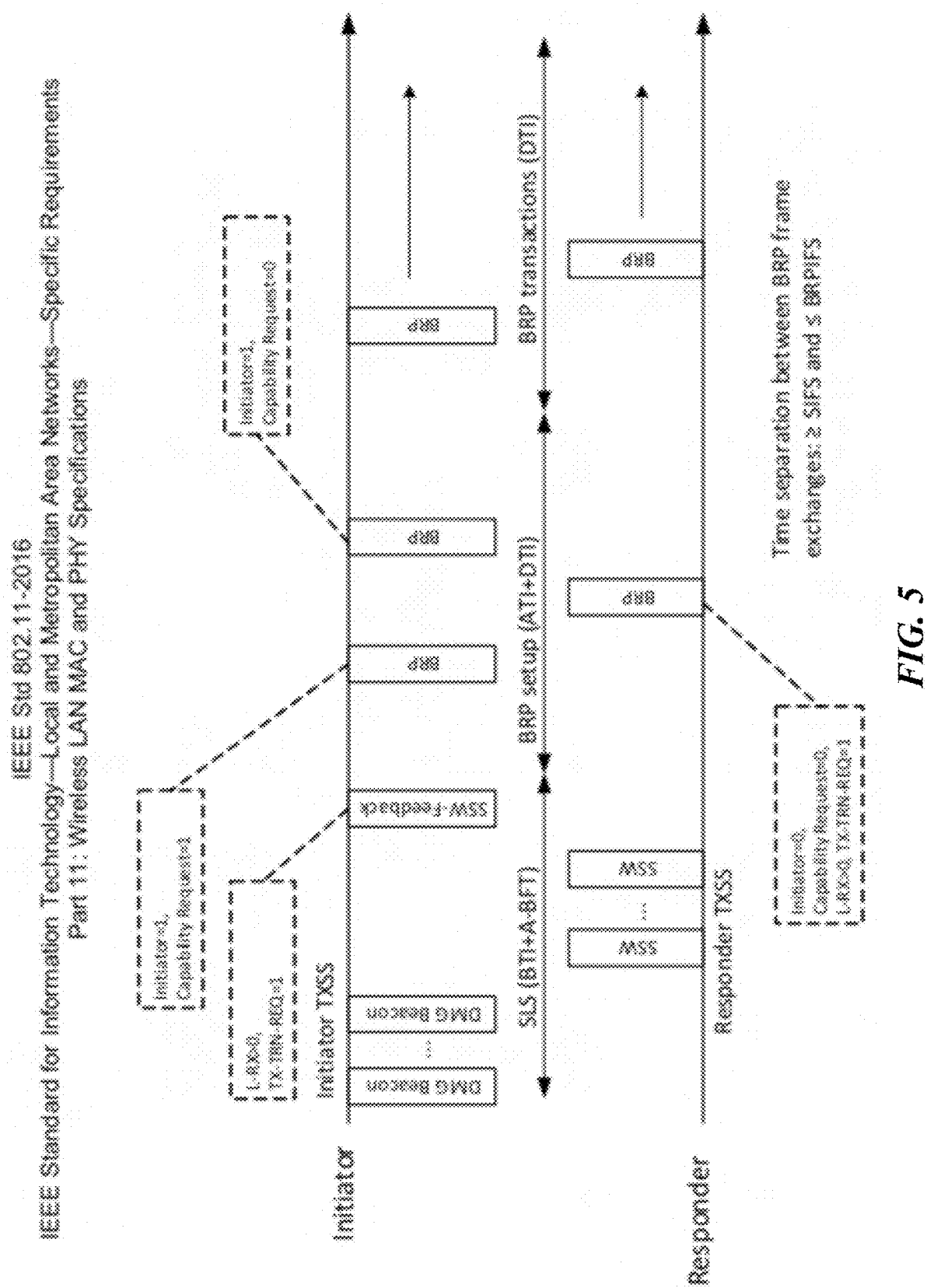
FIG. 5 illustrates an excerpt from the IEEE 802.11ay specification.

At step 250, the client 135 may reply to the beacon message with a sequence of sector sweep (SSW) frames. The client 135 may also follow up the SSW frames with a beam refinement protocol (BRP) which may specify a beamformer configuration to facilitate communication between the client and the stage. See FIG. 5 which shows an excerpt from the IEEE 802.11ay specification illustrating beacon messages transmitted by the stage 130 and SSW frame send in response to those beacon messages.

At step 260, the client 135 and stage 130 may each determine if the opposing device is a valid candidate for pairing based on the beacon message sent at step 240 and the SSW response sent at step 250. If each of the client 135 and stage 130 determine the opposing device is a valid candidate for pairing, the method may continue to step 270. If one or both of the client 135 and the stage 130 determine the opposing device is not a valid candidate, the method may return to step 220.

At step 270, the client 135 and stage 130 may exchange a shared secret. The purpose of the shared secret is to establish further confirmation that the client 135 can trust the stage 130 and the stage 130 can trust the client 135. At this point, the client 135 may have received the randomized stage address generated at step 220, the stage pairing public key generated at step 230, and a beamformer configuration to facilitate further communications with the stage.

In particular embodiments, the client 135 and stage 130 may exchange the shared secret using one or more techniques. The shared secret may only be used for a particular combination of client and stage. As an example and not by way of limitation, a client pairing with one stage may use a first shared secret, while the client, when attempting to pair with a second stage, may use a second shared secret. As another example and not by way of limitation, a stage pairing with one client may use a third shared secret, while the stage attempting to pair with a second client may use a fourth shared secret. In particular embodiments, these techniques may comprise out-of-band communications—that is, communications between the client and stage that do not use the same 802.11ay standard specified at steps 240-260. As another example and not by way of limitation, the client 135 may be pointed at the stage 130 to enable one or more cameras in the client 135 to establish a visualization of the stage 130 for comparison with radio-frequency inferred location of the stage 130 in artificial reality based on one or more of the beamformer data or the angle of arrival of communications from the stage. In another example and without limitation, the stage 130 may emit an LED blink pattern or display tracking LEDs that may be read by the cameras in the client 135. In yet another example without limitation, the stage 130 and client 135 may exchange an out-of-band secret using a wired direct serial or USB connection. In the latter two examples, the client 135 and stage 130 may both use a balanced password-authenticated key agreement that is not vulnerable to man-in-the-middle (MITM) attacks to validate the beacon-SSW communication. Additional examples without limitation may comprise communication using NFC, using the client cameras to observe movement of the stage, or using the client cameras to read a QR or similar code on the stage.

In yet further examples without limitations, the client 135 and stage 130 may share an out-of-band secret by displaying a serial number of the opposing device. In particular embodiments, the client 135 and stage 130 may each comprise a serial number on external labeling or packaging. This serial number also be present in data signed by the company providing either of the client 135 or stage 130, and this data may be exchanged as VS-IE exchanged at step 240. This signature may be used to confirm that each device has been authenticated by the company signing the data. In particular embodiments, the user may be able to create a nickname for devices that corresponds to the serial number to further facilitate validation. In particular embodiments, the shared secret exchanged here may be updated during subsequent communications between the client 135 and stage 130.

In particular embodiments, a client 135 and stage 130 that are shipped together may be provisioned with a shared secret because these devices should be expected to trust one another and there is no expectation of distrust of the system provisioning the stage 130 and client 135. In particular embodiments, the shared secret may be generated by and securely stored on each of the stage and the client 135 based on a production boot software image. It may be beneficial to encrypt the shared secret using the ephemeral public key generated at step 230.

The method started in FIG. 2 may continue at step 310 of FIG. 3 illustrated in FIGS. 2-3 by way of step 280). In step 310, the client 135 transmits a probe request to the stage 130. The probe request may comprise the randomized client address from step 220. The probe request may comprise VS-IE comprising WPA3-SAE (Simultaneous Authentication of Equals) messages. The SAE messages may be presented in extensible authentication protocol (EAP) format, where the client 135 may send an identifier (ID) message first, followed by a commit message, a confirm message, and an accept message. The VS-IE may be encrypted with the stage's pairing public key and may be signed using the client's pairing private key. The probe message may further comprise an SAE identifier ("SAE ID") and an SAE secret. For initial pairing attempts, this SAE ID and SAE secret may comprise the out-of-band shared secret shared at step 270. After each successful pairing connection between the client 135 and stage 130, the stage 130 may provide one or more IDs and/or secrets to be used in the SAE message. Accordingly, for subsequent pairing attempts, the SAE ID and SAE secret may be the value provided by the stage 130 during prior communication between the stage 130 and client 135. Note that each SAE ID and SAE secret may be unique to the client-stage pair to enable pairing between multiple pairs of clients and stages.

In the event that an active adversary attempts to capture the SAE ID, the SAE ID should only be seen by this adversary between two successful pairing events. To prevent leaking the SAE ID to adversaries and thereby prevent these adversaries from tracking either of the client 135 or stage, the stage 130 should only use a particular SAE ID for a certain number of pairing attempts within a specific time period. If multiple pairing attempts within that time period are unsuccessful, the stage 130 may revert to use a hard-coded ID that may indicate to the client 135 to attempt to re-pair by cycling through multiple shared secrets. For example, the re-pairing communications with a particular randomized stage address may use a shared secret for a series of attempts with a minimum delay between attempts, before cycling to a different shared secret and repeating the re-pairing attempts. While this may increase the time required to successful reconnect, but may prevent denial-of-service attacks to force the client 135 or stage 130 to attempt to pair from scratch and may thereby prevent an adversary from tracking the client 135 and/or device using the SAE ID.

At step 320, the stage 130 responds to the probe request. The probe response may comprise the randomized stage address from step 220. The probe response may comprise VS-IE comprising a WPA3-SAE message in response to the SAE message from the client 135. The VS-IE may be encrypted using the client's pairing public key and may be signed by the stage's pairing private key. Note that the stage 130 only listens for probe requests and only replies to probe requests during pairing and re-pairing attempts.

At step 330, the client 135 and stage 130 may each determine if the other device has been mutually verified. If each of the client 135 and stage 130 determine the opposing device has been mutually verified, the method may continue to step 340. However, if one or both of the client 135 and the stage 130 determine the opposing device is not a mutually verified, the method may return to step 310 and repeat steps 310-320 as necessary until the client 135 and stage 130 are able to mutually verify the other device. During this exchange of probe requests and responses, failed SAE exchanges may be ignored.

At step 340, the client 135 and stage 130 have mutually authenticated such that the client 135 trusts the stage 130 such that the client 135 transmit the its public key, serial number, and certificate chain to the stage 130. This message may be encrypted by the stage's pairing public key and may be signed by the client's pairing private key.

At step 350, the stage 130 may respond to the client transmission at step 340 by transmitting the public key, serial number, and certificate chain of the stage 130 to the client 135. This transmission may be encrypted with the client's pairing public key and signed by the stage's pairing private key. This transmission may comprise the randomized stage address from step 220. In the event the stage 130 or client 135 transmits a message containing a certificate chain that does not chain back to a trusted provider, for example and without limitation, the provider of the client and/or device, those messages may be ignored.

At step 360, the stage 130 may follow up its transmission at step 350 with an additional transmission comprising a common randomization parameter, a new shared secret, and anew SAE ID. In particular embodiments, the new shared secret may comprise a larger and more secure shared secret for future re-pairing attempts. Likewise, the new SAE ID may be used for future re-pairing events. This transmission may comprise the randomized stage address from step 220. The common randomization parameter may be a MAC randomization seed. The common randomization parameter may be used to initialize a pseudorandom number generator.

The pseudorandom number generator initialized with a particular common randomization parameter should always produce the same sequence of outputs. In certain embodiments, the common randomization parameter should not include hard-coded random values that might enable an adversary to attempt to break the randomization scheme using the common randomization parameter.

At step 370, after exchanging the common randomization parameter, the client 135 and stage 130 may each discard the randomized addresses currently in use. The client 135 may generate a new randomized client address and a new randomized stage address based on the new common randomization parameter. Likewise, the stage 130 may generate a new randomized stage address and a new randomized client address based on the new common randomization parameter. The new randomized addresses generated by each device should correspond based on the pseudorandom number generator. This enables the client 135 and stage 130 to know the new randomized address that will be used by the paired device and to send and receive communications to and from the paired device. Accordingly, the client 135 and stage 130 may then initiate a paired communication session using the new randomized stage address and the new randomized client address. The client 135 and stage 130 may periodically and synchronously generate one or more additional randomized stage addresses and additional randomized client addresses based on the common randomization parameter to facilitate additional paired communication sessions. For example, the client 135 and stage 130 may communicate to modify the existing common randomization parameter, such that a new sequence of outputs are generated by the pseudorandom number generator. In particular embodiments, the client 135 and stage 130 may exchange a second common randomization parameter, where the second common randomization parameter may be used by the client 135 and stage 130 to periodically generate a new randomized stage address and a new randomized client address to facilitate subsequent pairing or re-pairing attempts and additional paired communication sessions.

One benefit of using the common randomization parameter for randomized address generation may be an adversary tracking communications between the client 135 and stage 130 using the now-discarded MAC addresses may be barred from further tracking when the client 135 and stage 130 begin communicating using the new randomized addresses. Additional benefits of using the common randomization parameter to generate new randomized addresses is the client 135 and stage 130 may each generate the randomized addresses based on the common randomization parameter and therefore need not exchange the new randomized addresses before using the new randomized addresses. Therefore, if any communications between the client 135 and stage 130 have been compromised—for example by an adversary attempting to track the client 135 and stage 130*a*—leak of the common randomization parameter alone is insufficient to compromise the new randomized addresses. Another benefit of the common randomization parameter is this parameter enables periodically changing randomized addresses to prevent further tracking and that these periodic changes in the randomized addresses need no longer be tied to a particular pairing attempt between the client 135 and stage 130 as it is in existing solutions. See also step 430. Once the client 135 and stage 130 have generated new random MAC addresses, the method may continue to step 410 (illustrated in FIGS. 3-4 by way of step 380).

At step 410, the client 135 and stage 130 may begin remote attestation. During remote attestation, the client 135 and stage 130 each indicate to the paired device that an authenticated software image is operating on both devices.

At step 420, the client 135 and stage 130 determine if remote attestation was successful. If successful, the method may continue to step 430. If remote attestation fails, the method may return to step 220 where the client 135 and stage 130 may make another attempt top pair (illustrated in FIGS. 1 and 4 by way of step 425).

The method continued in FIG. 3 may continue at step 430 of FIG. 4. At step 430, the client 135 and stage 130 begin normal operation. In particular embodiments, the stage 130 may communicate with the client to provide video and audio data for rendering at the client 135 to support an artificial reality user experience. In particular embodiments, the stage 130 may be responsible for controlling the wireless link between the stage 130 and client 135 during this part of operation. The stage 130 may also enable power saving features unless the stage 130 receives a notification that the client 135 is attempting to enter an extended sleep mode. Periodically, during normal operations, the client 135 and stage 130 may exchange new common randomization parameters. After exchanging the new common randomization parameters, the client 135 and stage 130 may discard the randomized addresses currently in use, may generate new randomized addresses based on the new common randomization parameters, and may continue the paired communication session using the new randomized addresses.

At step 440, the stage 130 may check for a notification indicating the client 135 is attempting to enter the extended sleep mode. Alternatively, a variety of conditions may prompt entering the extended sleep mode. As another example and not by way of limitation, the client 135 may request the extended sleep mode if the client 135 experiences an extended period of loss of signal from the stage, when one or more sensors on the client 135 indicate the client 135 is no longer in use by a user—for example without limitation, if the client 135 has side-arms that are closed—or when the client 135 receives a notification from the paired stage 130 to enter the extended sleep mode. In another example without limitation, the stage 130 may initiate an extended sleep mode when the stage 130 experiences an extended period of loss of signal from the client 135, based on an input from the user, when the stage 130 receives a notification from the paired client 135. If no such signal is received or conditions are met, the client 135 and stage 130 may continue normal operations. If any signals or conditions are met, the client 135 and stage 130 may continue to step 450. Otherwise, the client 135 and stage 130 may return to normal operations as identified at step 430.

At step 450, after receiving a notification or one of the conditions to prompt the client 135 or stage 130 to enter a sleep mode, the client 135 and/or stage 130 may enter a sleep mode. In particular embodiments, the extended sleep mode on the client 135 may enable a very low power mode. In contrast, the extended sleep mode on the stage 130 may be a very low power mode, but the stage 130 may also be able to receive notifications which may trigger generation of tones, enable LEDs, and/or haptics on the stage.

At step 460, the client 135 and/or stage 130 may wait for a signal to prompt the client 135 and/or stage 130 to wake from the sleep mode. In particular embodiments, the stage 130 may exit the extended sleep mode based on one or more prompts. As an example and not by way of limitation, the stage 130 may exit the extended sleep mode based on a user tapping a button on the stage. As another example and not by way of limitation, the client 135 may exit the extended sleep mode based on one or more events. In particular embodiments, a wake notification may be provided if one or more sensors on the client 135 indicating the client 135 is back in use by a user (for example without limitation, if the client 135 has side-arms that are opened). In particular embodiments, the client 135 may receive a notification from the paired stage 130 to exit extended sleep mode. In particular embodiments, a user may tap a button on the client 135 to exit extended sleep mode.

At step 470, the stage 130 and client 135 may wake from the sleep mode and enter a re-pairing mode. Once the re-pairing process is complete, the stage 130 and client 135 may return to step 430 to normal operations. The re-pairing process may comprise one or more steps of methods 200, 300, or 400.

Additionally, the stage 130 and client 135 may enter a power-on mode after either of the client 135 and/or the stage 130 is turned off. When entering the power-on mode, the stage 130 may return to step 240 and transmit beacon messages to the client 135 to pair using a new pairing public key and a new randomized stage address. Likewise, the client 135 may generate a new randomized client address for this re-pairing process. On subsequent re-pairing between client and stage devices, the out-of-band secret shared at step 270 may persist in secure storage on each device to be reused, but the client 135 and stage 130 may require additional steps to be performed before re-pairing is complete.

Particular embodiments may repeat one or more steps of the method of FIGS. 2-4, where appropriate. Although this disclosure describes and illustrates particular steps of the method of FIGS. 2-4 as occurring in a particular order, this disclosure contemplates any suitable steps of the method of FIGS. 2-4 occurring in any suitable order. Moreover, although this disclosure describes and illustrates an example method for methods 200, 300, 400 including the particular steps of the method of FIGS. 2-4, this disclosure contemplates any suitable methods for 200, 300, 400 including any suitable steps, which may include all, some, or none of the steps of the method of FIGS. 2-4, where appropriate. Furthermore, although this disclosure describes and illustrates particular components, devices, or systems carrying out particular steps of the method of FIGS. 2-4, this disclosure contemplates any suitable combination of any suitable components, devices, or systems carrying out any suitable steps of the method of FIGS. 2-4.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 6:
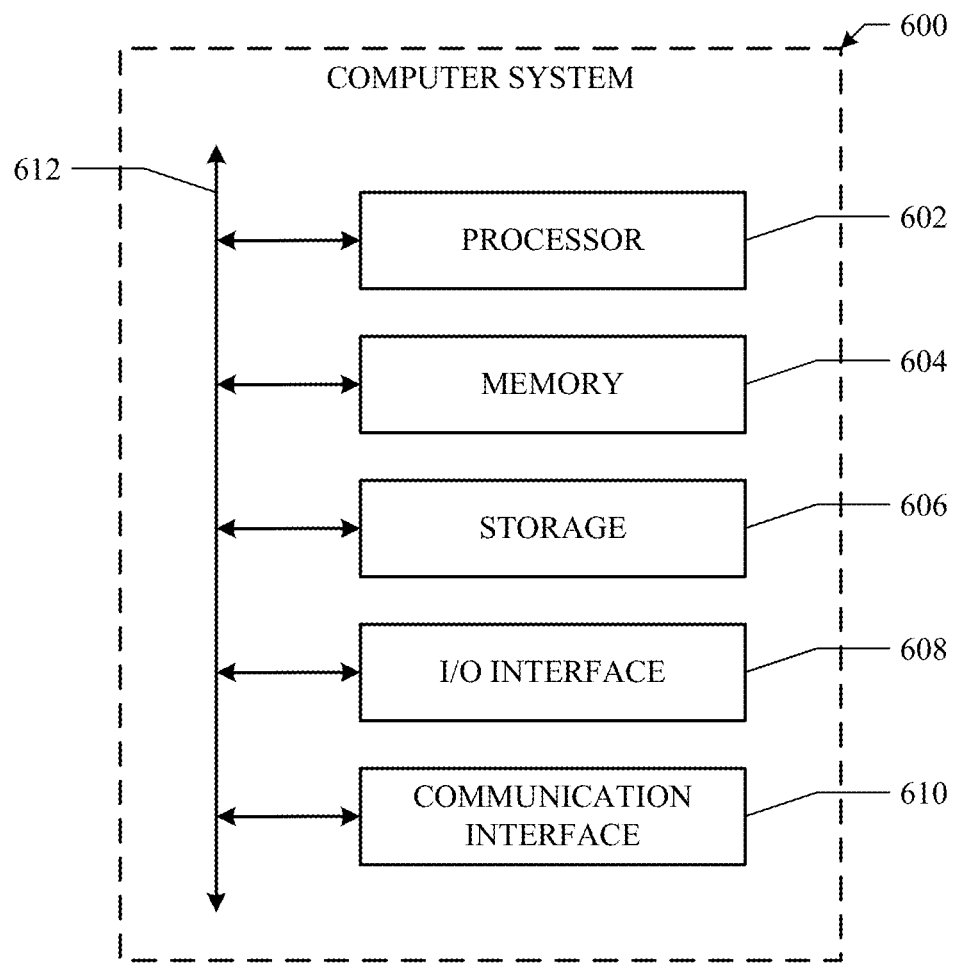
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (IO) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a stage device:
   receiving, from a client device, a first randomized client address to be used during a pairing session;
   sending, to the client device, a first randomized stage address to be used during the pairing session;
   communicating with the client device using the first randomized client address and the first randomized stage address to establish at least one common randomization parameter;
   periodically generating, based on the at least one common randomization parameter, a second randomized client address and a second randomized stage address; and
   communicating with the client device in a paired communication session using the second randomized client address and the second randomized stage address.

2. The method of claim 1, wherein the client device and the stage device relocate together during the paired communication session.

3. The method of claim 1, wherein the periodically generating the second randomized stage address and the second randomized client address is further based on a real-time clock of the stage device.

4. The method of claim 1, further comprising verifying the client device by comparing client shared secret data received from the client device against stage shared secret data stored on the stage device.

5. The method of claim 4, wherein verifying the client device comprises an out-of-band interaction with the client device.

6. The method of claim 5, wherein the out-of-band interaction is based on one or more of: an LED blink pattern, a wired connection, a near field communication, a detection of motion of the stage device, a QR code, or a serial number.

7. The method of claim 4, wherein one or more of the client shared secret data and the stage shared secret data was established during a previous paired communication session between the stage device and the client device.

8. The method of claim 4, wherein verifying the client device is based on a Simultaneous Authentication of Equals (SAE) algorithm.

9. The method of claim 8, wherein one or more of the stage shared secret data and the client shared secret data comprises one or more of a SAE identifier and a SAE secret.

10. The method of claim 9, further comprising:
    receiving, during the paired communication session, one or more of a second SAE identifier and a second SAE secret, and
    using the at least one of the second SAE identifier or the second SAE secret in a subsequent paired communication session.

11. The method of claim 1, wherein the at least one common randomization parameter is modified periodically.

12. The method of claim 1, wherein the communicating with the client device to establish the at least one common randomization parameter with the stage device is encrypted.

13. The method of claim 1, further comprising:
    periodically generating, based on the at least one common randomization parameter, a third randomized client address and a third randomized stage address; and
    communicating with the client device in a second paired communication session using the third randomized client address and the third randomized stage address.

14. One or more computer-readable non-transitory storage media embodying software that is operable when executed by a stage device to:
- receive, from a client device, a first randomized client address to be used during a pairing session;
- send, to the client device, a first randomized stage address to be used during the pairing session;
- communicate with the client device using the first randomized client address and the first randomized stage address to establish at least one common randomization parameter;
- periodically generate, based on the at least one common randomization parameter, a second randomized client address and a second randomized stage address; and
- communicate with the client device in a paired communication session using the second randomized client address and the second randomized stage address.

15. The media of claim 14, wherein the software is further operable when executed by the stage device to: verify the client device by comparing client shared secret data received from the client device against stage shared secret data stored on the stage device.

16. The media of claim 14, wherein the software is further operable when executed by the stage device to:
- communicate with the client device during the paired communication session to establish a second common randomization parameter;
- periodically generate, based on the second common randomization parameter, a third randomized client address and a third randomized stage address; and
- communicate with the client device in a second paired communication session using the third randomized client address and the third randomized stage address.

17. The media of claim 14, wherein the software is further operable when executed by the stage device to: periodically modify the at least one common randomization parameter.

18. A stage device comprising:
- one or more processors; and
- one or more computer-readable non-transitory storage media coupled to one or more of the one or more processors and comprising instructions operable when executed by one or more of the one or more processors to cause the stage device to:
- receive, from a client device, a first randomized client address to be used during a pairing session;
- send, to the client device, a first randomized stage address to be used during the pairing session;
- communicate with the client device using the first randomized client address and the first randomized stage address to establish at least one common randomization parameter;
- periodically generate, based on the at least one common randomization parameter, a second randomized client address and a second randomized stage address; and
- communicate with the client device in a paired communication session using the second randomized client address and the second randomized stage address.

19. The stage device of claim 18, wherein the instructions are further operable when executed by the one or more of the one or more processors to: verify the client device by comparing client shared secret data received from the client device against stage shared secret data stored on the stage device.

20. The stage device of claim 18, wherein the instructions are further operable when executed by the one or more of the one or more processors to:
- communicate with the client device during the paired communication session to establish a second common randomization parameter;
- periodically generate, based on the second common randomization parameter, a third randomized client address and a third randomized stage address; and
- communicate with the client device in a second paired communication session using the periodically generated third randomized client address and the third randomized stage address.

* * * * *